Figure 1:
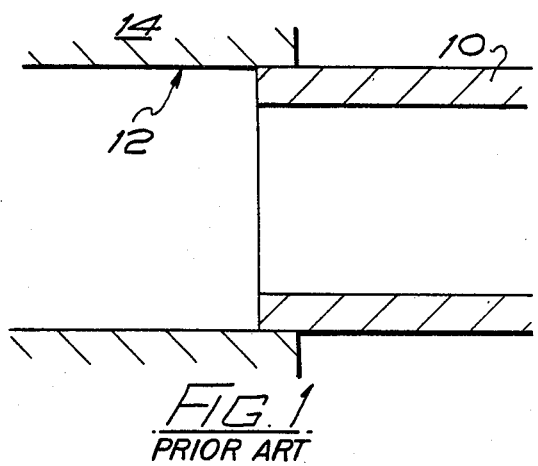

United States Patent [19]

Greenfield

[11] Patent Number: 4,481,399

[45] Date of Patent: Nov. 6, 1984

[54] WELDING OF TUBES TO TUBE PLATES

[75] Inventor: Alan Greenfield, Rotherham, England

[73] Assignee: Robert Jenkins & Co., Rotherham, England

[21] Appl. No.: 406,332

[22] Filed: Aug. 9, 1982

[30] Foreign Application Priority Data

Aug. 17, 1981 [GB] United Kingdom ............... 8125098

[51] Int. Cl.³ ............................................. B23K 9/02
[52] U.S. Cl. ..................................... 219/60.2; 219/61
[58] Field of Search ................... 219/60 A, 60.2, 61, 219/61.3, 125.11, 118

[56] References Cited

U.S. PATENT DOCUMENTS

| 3,139,506 | 6/1964 | Wolff et al. ............................ 219/74 |
| 3,159,734 | 12/1964 | Cooksey et al. .................... 219/60.2 |
| 3,350,537 | 10/1967 | Lawrence et al. ................. 219/60.2 |
| 3,496,323 | 2/1970 | Lesnewich et al. ................. 219/74 |
| 3,769,489 | 10/1973 | Charlesworth ............... 219/60 A X |

OTHER PUBLICATIONS

Howard B. Cary, *Modern Welding Technology*, "Shielding Gases Used in Welding", pp. 359–360.

*Primary Examiner*—Roy N. Envall, Jr.
*Assistant Examiner*—C. M. Sigda
*Attorney, Agent, or Firm*—Lockwood, Dewey, Alex & Cummings

[57] ABSTRACT

Welding of tubes to tube plates using a non-consumable electrode to locally melt the wall of a tube and an adjacent area of the tube plate where the tube has been entered into a hole in the tube plate and including an initial weld preparation comprising the machining of one face of the tube plate to produce respective annular grooves concentrically around the holes into which the tubes are subsequently to be entered for welding.

6 Claims, 5 Drawing Figures

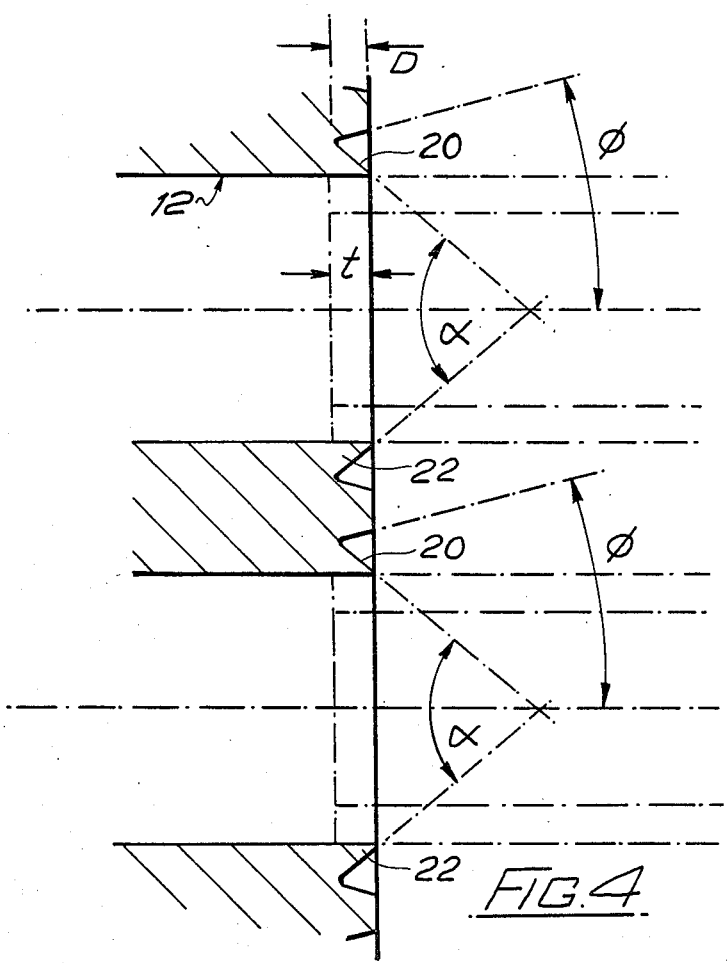
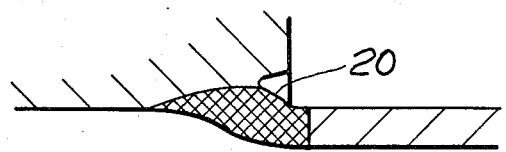
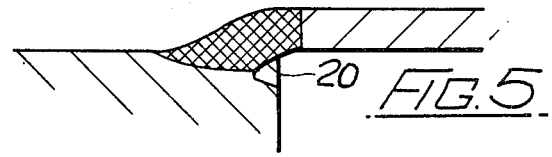
FIG. 4
FIG. 5

WELDING OF TUBES TO TUBE PLATES

The invention relates to the welding of tubes to tube plates in the manufacture of heat exchangers, particularly high pressure heat exchangers used in severely corrosive conditions.

In the manufacture of high pressure heat exchangers which are to be used in extremely severe conditions of pressure and/or in corrosive environments it is becoming necessary to use tubes and tube plates of especially suitable metals such as titanium and titanium alloys. (Because such metals are very expensive, the tube plates may not be made entirely of that particular metal but may be faced on at least one side with titanium or with a titanium alloy or the like. However, for reasons which will be explained, in such a case the welding of the tubes to such a tube plate will be to the facing metal, that is to say to the titanium or titanium alloy or the like).

In the manufacture of heat exchangers generally, and particularly in the manufacture of heat exchangers which will be used in a corrosive environment, for example those coming in contact with sea water or used in chemical plant, it is necessary to effect the welding of the tubes to the tube plates at the back face of the plates, in a manner which results in full weld penetration at the weld root without the formation of crevices within the welded joint in which corrosion could take place (and this is why the welding of a tube to a tube plate faced with a corrosion resisting metal will be to the facing metal).

In order to effect the welding of a tube to a tube plate without the formation of a crevice within the welded joint, it is known to use a technique which involves the use of a non-consumable electrode mounted at one end of a rotatable holder, the electrode being inserted into or positioned adjacent the end of the tube which has been entered into a hole in the tube plate so that as the holder rotates, moving the electrode around within the bore of the tube or around an annular end surface of the tube, the arc which is produced between the electrode and the tube generates intense heat and locally melts the wall of the tube and an adjacent area of the tube plate, the two thereby being fused together along the whole distance by which the tube was initially entered into the tube plate and the resulting joint being such that there is produced a transition of smoothly changing bore section from the bore of the tube to that of the hole in the tube plate. However, it is found that the use of this technique is somewhat difficult where the tubes and tube plates are made of so-called reactive metals such as titanium or titanium alloys (or where the tube plates are faced with such reactive metals as previously explained). The reasons for this difficulty are somewhat complex but can be broadly defined as a difficulty in balancing the heat sinks of the parts to be united. It may be found that a welding operation can be started, and may proceed satisfactorily for some time, but cannot be completed without an excessive build-up of heat in adjoining sections of the tube and tube plate concerned, such a build-up of heat preventing the successful completion of the welding operation. For this reason the heat input to the joint being produced must be carefully controlled.

The invention as claimed is intended to provide a remedy. It solves the problem of how to weld a tube to a tube plate, when the two are made of a reactive metal, in a manner which results in full weld penetration at the weld root without the formation of crevices within the welded joint.

The advantages offered by the invention are mainly that it provides a very simple means whereby the heat sinks of the parts to be united can be balanced so that by the careful control of the welding parameters there can be obtained consistently high quality welds throughout an entire tube plate. A large number of tubes can be welded in turn to a tube plate without a build-up of heat in the tube plate during the welding operation preventing the successful completion of the operation.

Figure 2:
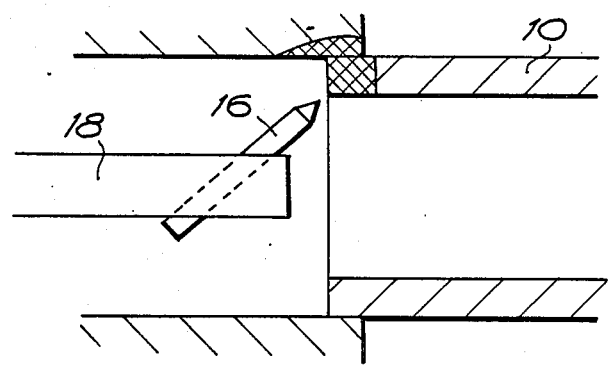
Figure 3:
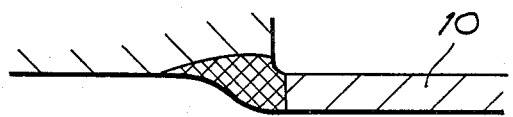

One way of carrying out the invention is described in detail below with reference to drawings which illustrate only one specific embodiment, in which:

FIG. 1 is a sectional scrap view showing a tube entered into a hole in a tube plate in readiness for a subsequent so-called bore welding operation, FIG. 2 is a view showing the positioning of a non-consumable electrode prior to the bore welding operation being carried out, FIG. 3 is a view illustrating the form of weld typically obtained by this known form of welding when the tube and tube plate have been made of metal not unduly difficult to weld, FIG. 4 is a view illustrating a so-called weld preparation method forming a part of the invention, and FIG. 5 is a view similar to FIG. 3 and illustrating the form of weld typically obtained when using this weld preparation method, even when the tube and tube plate have been made of metal difficult to weld such as titanium and titanium alloys.

Referring now to FIGS. 1 and 2, these drawings illustrate the known technique of entering a tube 10 into a hole 12 in a tube plate 14 and welding it in position by the use of a non-consumable electrode 16 mounted at the end of a rotatable holder 18, the electrode being inserted into or positioned adjacent the end of the tube as shown in FIG. 2 so that as the holder rotates, moving the electrode around within the bore of the tube or around the annular end surface of the tube, the arc which is produced between the electrode and the tube generates intense heat and locally melts the wall of the tube and an adjacent area of the tube plate, the two thereby being fused together along the whole distance by which the tube was initially entered into the tube plate. Such a technique is carried out in an inert atmosphere so that the composition of the metal is not changed during the welding process, this usually being an atmosphere of Argon. In FIG. 3 there is illustrated the form of weld typically obtained by this method, that is to say a transition of smoothly changing bore section from the bore of the tube to that of the hole in the tube plate.

Referring now to FIG. 4, this illustrates a so-called weld preparation method forming a part of the invention prior to the use of the welding technique referred to above, and in particular for use when the tube and tube plates have been made of a metal difficult to weld, that is to say a reactive metal such as titanium or a titanium alloy. The weld preparation comprises the forming of the tube plate with a plurality of holes 12 in which the ends of the tubes are subsequently to be welded, and the machining of one face of the tube plate to produce respective annular grooves 20 therein, said grooves being formed concentrically with the respective holes into which the tube are subsequently to be entered and the arrangement being such that, in effect, the tube plate is formed with a plurality of short and stubby sleeve portions 22 of tube plate metal into which the tubes are subsequently to be entered for welding, said sleeve portions being formed within the original thickness of the tube plate. It will be seen that in the illustrated embodiment each annular groove is shown to be of V-shape, and the bottom of the groove being very slightly rounded to avoid a sharp corner which would be a point of weakness. The depth D of each groove is approximately the same as the wall thickness of the tube which is subsequently to be entered into the hole for welding. The dimension t by which the tube will subsequently be entered into the hole for welding will also be substantially the same as the wall thickness of the tube concerned.

It will be seen that the tapering sleeve portion of tube plate metal surrounding each hole 12 tapers down to a sharp edge where it meets the hole diameter. For optimum results it has been found that the angle $\alpha$, that is to say the included angle of each tapering sleeve, should be in the region of 84°. It has been found that the other side wall of each groove, that is to say the radially outer side wall of each groove, can be inclined at a relatively small angle $\phi$ to the axis of the hole concerned, this angle ideally being about 15° (so that in this case the included angle of the groove is in the region of 57°).

When the back face welding operation has subsequently been carried out, following a weld preparation as just described, the weld typically obtained is substantially as shown in FIG. 5, that is to say very similar to that illustrated in FIG. 3, being free of any crevice within the weld and exhibiting a transition of smoothly changing bore section from the bore of the tube to that of the hole in the tube plate. This is due to the fact that the weld "pool" produced during the welding operation has, due to surface tension, solidified into a flared form at the end of the tube. The area in which the metal has been melted is indicated by the cross hatched lines. This amount and general form of weld "pool" has been found to result in a very satisfactory finished weld. However, the welding operation will have been very greatly facilitated by virtue of the fact that such a weld preparation makes it possible to match the heat sinks of the parts being united together even when the tubes and tube plates are made of titanium or a titanium alloy, these being so-called reactive metals which are very difficult to weld.

Various modifications may be made. For example, it may be found that the annular grooves 20 do not need to be of exactly the cross sectional shape shown in the drawing. However, it will be understood that the tapering cross sectional shape of the short and stubby sleeve portions 22 of tube plate metal is quite important to the successful welding of the reactive metals referred to. It may well be that the invention will be found to be useful in the welding of tube and tube plates made of other metals difficult to weld and not simply the reactive metals such as titanium and titanium alloys.

It will be understood that the variables in connection with the welding operation will be determined according to the sizes of the tubes and the tube wall thickness, that is to say the rate of movement of the non-consumable electrode (which may or may not be a modulated movement) and the electric power (which may or may not be modulated also). It has been found that the inventive method is best carried out using an arc hotter than usually used when bore welding. For this reason the process has been carried out in an inert atmosphere constituted by a mixture of helium and argon. However, it will be understood that this will not be essential in all circumstances.

What I claim and desire to secure by Letters Patent is:

1. A method of welding a tube to a tube plate and involving the use of a non-consumable electrode mounted at one end of a rotatable holder the electrode being positioned adjacent the end of the tube which has been entered into a hole in the tube plate so that as the holder rotates the arc which is produced between the electrode and the tube generates intense heat and locally melts the wall of the tube and an adjacent area of the tube plate, the two thereby being fused together along the whole distance by which the tube has been entered into the tube plate, the method including the initial step of machining the tube plate to produce an annular groove in that face of the tube plate from which the tube is to be entered into the tube plate, the annular groove being concentric with the hole in said tube plate, and to further produce a sleeve portion of tube plate metal radially within the groove, the sleeve portion tapering down to a sharp edge where it meets the hole diameter.

2. A method of welding a tube to a tube plate according to claim 1, including the further step of carrying out the welding operation in an atmosphere constituted by a mixture of helium and argon.

3. A weld preparation in a tube plate in which a plurality of tubes are to be back face welded, the weld preparation comprising the forming of the tube plate with a plurality of holes in which the tubes are subsequently to be welded, and the machining of one face of the tube plate to produce respective annular grooves therein, said grooves being formed concentrically with the respective holes into which the tubes are subsequently to be entered, the arrangement being such that, in effect, the tube plate is formed with a plurality of tapering sleeve portions into which the tubes are subsequently to be entered for welding, said tapering sleeve portions being formed within the original thickness of the tube plate and being of tapering wall thickness such that each sleeve portion tapers down to a sharp edge where it meets the hole diameter within it.

4. A weld preparation according to claim 3, in which each annular groove is of V-shape, the bottom of the groove being very slightly rounded.

5. A weld preparation according to claim 4, in which the included angle of the tapering sleeve portion of tube plate metal is in the region of 84°, that is to say between 78° and 90°.

6. A weld preparation according to claim 5, in which the other side wall of the groove, that is to say the radially outer side wall of the groove, is inclined at an angle of between 5° and 25° to the axis of the hole.

* * * * *